US012686225B2

(12) United States Patent
Snodgrass et al.

(10) Patent No.: US 12,686,225 B2
(45) Date of Patent: Jul. 21, 2026

(54) LASER-IMAGEABLE COMPOSITION

(71) Applicant: DataLase Ltd., Widnes (GB)

(72) Inventors: Jonathan Snodgrass, Widnes (GB); Richard Cook, Widnes (GB)

(73) Assignee: DataLase Ltd., Widnes (GB)

( * ) Notice: Subject to any disclaimer, the term of this patent is extended or adjusted under 35 U.S.C. 154(b) by 628 days.

(21) Appl. No.: 17/995,435

(22) PCT Filed: Apr. 29, 2021

(86) PCT No.: PCT/EP2021/061253
§ 371 (c)(1),
(2) Date: Oct. 4, 2022

(87) PCT Pub. No.: WO2021/219781
PCT Pub. Date: Nov. 4, 2021

(65) Prior Publication Data

US 2023/0185197 A1 Jun. 15, 2023

(30) Foreign Application Priority Data

Apr. 30, 2020 (EP) .................................... 20172519
Jul. 1, 2020 (GB) ..................................... 2010080

(51) Int. Cl.
*B41M 5/28* (2006.01)
*B41M 5/26* (2006.01)

(52) U.S. Cl.
CPC ............... *B41M 5/28* (2013.01); *B41M 5/267* (2013.01); *B41M 2205/04* (2013.01)

(58) Field of Classification Search
CPC .......... B41M 5/26; B41M 5/267; B41M 5/28; B41M 5/3372; B41M 5/3375; B41M 2205/04
See application file for complete search history.

(56) References Cited

U.S. PATENT DOCUMENTS

| | | | |
|---|---|---|---|
| 5,370,988 | A | 12/1994 | Manganiello et al. |
| 5,439,790 | A | 8/1995 | Muthyala et al. |
| 6,925,051 | B2 | 8/2005 | Wisnudel et al. |
| 7,163,987 | B2 | 1/2007 | Weber et al. |
| 7,485,403 | B2 | 2/2009 | Khan |
| 10,005,304 | B2 | 6/2018 | Clayton et al. |
| 2005/0049931 | A1 | 3/2005 | Wisnudel et al. |
| 2005/0050571 | A1 | 3/2005 | Wisnudel et al. |
| 2010/0059691 | A1 | 3/2010 | Lewis et al. |
| 2011/0248225 | A1 | 10/2011 | Mamak et al. |
| 2014/0028011 | A1 | 1/2014 | Yamauchi et al. |
| 2014/0057783 | A1 | 2/2014 | Stork et al. |
| 2018/0056690 | A1 | 3/2018 | Bollstrom et al. |
| 2018/0141364 | A1 | 5/2018 | Steenackers et al. |

FOREIGN PATENT DOCUMENTS

| | | |
|---|---|---|
| CA | 2855287 | 4/2013 |
| FR | 3065728 | 11/2018 |
| JP | H07314904 | 12/1995 |
| JP | H0958134 | 3/1997 |
| JP | H0958135 | 3/1997 |
| JP | 2004522631 A | 7/2004 |
| JP | 2004223884 | 8/2004 |
| JP | 200769620 A | 3/2007 |
| JP | 201775222 A | 4/2017 |
| JP | 2019010822 | 1/2019 |
| JP | 2019142090 | 8/2019 |
| WO | 2005/068207 | 7/2005 |
| WO | 2006/108745 | 10/2006 |
| WO | 2009/093028 | 7/2009 |
| WO | 2010/001171 | 1/2010 |
| WO | 2010/029329 | 3/2010 |
| WO | 2012/114121 | 8/2012 |
| WO | 2013/068729 | 5/2013 |
| WO | 2013/098076 | 7/2013 |
| WO | 2015/015200 | 2/2015 |
| WO | 2016/097667 | 6/2016 |
| WO | 2016/184881 | 11/2016 |
| WO | 2017/157888 | 9/2017 |
| WO | 2020/105564 | 5/2020 |

OTHER PUBLICATIONS

Machine translation of detailed description of JP 2017-075222 acquired on May 13, 2025.*
International Search Report and Written Opinion, International Application No. PCT/EP2021/081293, Jan. 24, 2022, 12 pages.
International Search Report and Written Opinion, International Application No. PCT/EP2021/061253, mail date Jul. 12, 2021, 9 pages.
International Search Report and Written Opinion, International Application No. PCT/GB2020/053186, PCT/ISA/210 and PCT/ISA/237, mail date Mar. 25, 2021, 9 pages.

* cited by examiner

*Primary Examiner* — Gerard Higgins
(74) *Attorney, Agent, or Firm* — SALIWANCHIK, LLOYD & EISENSCHENK

(57) ABSTRACT

The present invention relates to a laser-imageable composition comprising an oxyanion of a multivalent metal and an oligomer, wherein the oxyanion of a multivalent metal comprises particles having a $D_{50}$ particle size distribution of 10 μm or less. A method of formulation of the laser-imageable composition and a substrate comprising the laser-imageable composition applied thereto are also disclosed.

26 Claims, No Drawings

LASER-IMAGEABLE COMPOSITION

CROSS-REFERENCE TO RELATED APPLICATIONS

This application is a national stage application of International Patent Application No. PCT/EP2021/061253, filed Apr. 29, 2021, which claims priority to European Application No. 20172519.9, filed Apr. 30, 2020 and Great Britain Application No. 2010080.6, filed Jul. 1, 2020, the disclosures of each of which are incorporated herein by reference in their entirety, including any figures, tables, and drawings.

FIELD OF THE INVENTION

The present invention relates to a laser-imageable composition. The present invention further relates to a substrate comprising the laser-imageable composition applied thereto, and a method of forming the laser-imageable composition.

BACKGROUND OF THE INVENTION

The use of laser-imageable compositions for variable information printing to produce human and/or machine readable elements is known. Following application of a laser-imageable composition to a substrate, an image(s) can be formed upon application of an appropriate stimulus to the laser-imageable composition.

The laser-imageable compositions can be applied to substrates using a number of different known printing processes. Each of these printing processes provides a layer(s) of the laser-imageable composition on the substrate at a particular coat weight. For the application of laser-imageable compositions to substrates at low coat weights, a preferred printing process is offset lithographic printing. This high-quality printing technique is capable of applying laser-imageable compositions to substrates at coat weights typically in the range of 0.7 to 1.8 gsm (grams per square metre) per layer of composition; the low coat weights meaning that the printing process is often commercially favoured from a cost perspective.

Oxyanions of multivalent metals are known in the art as compounds of laser-imageable compositions. Such compounds are capable of generating high contrast human and/or machine readable images upon exposure of the laser-imageable composition to an appropriate stimulus. However, for oxyanions of multivalent metals to be utilised in an offset lithographic printing process, multiple layers of the laser-imageable composition have to be applied to a substrate in order to facilitate high contrast image formation. The low coat weights generated by the offset lithographic printing technique means that a single application of a laser-imageable composition comprising an oxyanion of a multivalent metal is insufficient to produce a high contrast human and/or machine readable image. This requirement for multiple layers of the laser-imageable composition is time-consuming and occupies significant space on printing apparatus, such that offset lithographic printing is not commonly considered commercially viable for laser-imageable compositions comprising an oxyanion of a multivalent metal.

Consequently, printing processes for applying laser-imageable compositions comprising oxyanions of multivalent metals to substrates for the generation of desirable variable information thereon are often restricted to only printing techniques that deliver higher coat weights of the laser-imageable compositions, such as flexographic, gravure and screen printing.

It is therefore desirable to provide a laser-imageable composition comprising an oxyanion of a multivalent metal, said composition being capable of providing human and/or machine readable high contrast images upon exposure to an appropriate stimulus following application of the laser-imageable composition to a substrate at a low coat weight by offset lithographic printing, including following application of only a single layer of the laser-imageable composition to the substrate.

SUMMARY OF THE INVENTION

According to a first aspect of the present invention, there is provided a laser-imageable composition comprising:

(a) an oxyanion of a multivalent metal and (b) an oligomer;

wherein the oxyanion of a multivalent metal comprises particles having a $D_{50}$ particle size distribution of 10 μm or less.

According to a second aspect of the invention, there is provided a method of forming a laser-imageable composition comprising:

(a) an oxyanion of a multivalent metal and (b) an oligomer;

wherein the oxyanion of a multivalent metal in the laser-imageable composition comprises particles having a $D_{50}$ particle size distribution of 10 μm or less, the method comprising combining an oxyanion of a multivalent metal and an oligomer.

According to a third aspect of the present invention, there is provided a substrate comprising a laser-imageable composition applied thereto, the laser-imageable composition comprising:

(a) an oxyanion of a multivalent metal and (b) an oligomer;

wherein the oxyanion of a multivalent metal comprises particles having a $D_{50}$ particle size distribution of 10 μm or less.

According to a fourth aspect of the present invention, there is provided a method of forming a substrate having a laser-imageable composition applied thereto, the method comprising applying a laser-imageable composition to a substrate, the laser-imageable composition comprising:

(a) an oxyanion of a multivalent metal and (b) an oligomer;

wherein the oxyanion of a multivalent metal comprises particles having a $D_{50}$ particle size distribution of 10 μm or less.

According to a fifth aspect of the present invention, there is provided a method of forming an image on a substrate comprising a laser-imageable composition applied thereto, the laser-imageable composition comprising:

(a) an oxyanion of a multivalent metal and (b) an oligomer;

wherein the oxyanion of a multivalent metal comprises particles having a $D_{50}$ particle size distribution of 10 μm or less, and wherein the method comprises exposing the laser-imageable composition to radiation to form an image on the substrate.

According to a sixth aspect of the present invention, there is provided a use of a laser-imageable composition in offset lithographic printing, the laser-imageable composition comprising:

(a) an oxyanion of a multivalent metal and (b) an oligomer;

wherein the oxyanion of a multivalent metal comprises particles having a $D_{50}$ particle size distribution of 10 μm or less.

According to a seventh aspect of the present invention, there is provided a use of a laser-imageable composition in the formation of an image on a substrate, the laser-imageable composition comprising:

(a) an oxyanion of a multivalent metal and (b) an oligomer;

wherein the oxyanion of a multivalent metal comprises particles having a $D_{50}$ particle size distribution of 10 μm or less.

DETAILED DESCRIPTION OF THE INVENTION

It has been surprisingly and advantageously found that the laser-imageable composition according to the present invention can facilitate the production of high contrast human and/or machine readable images on a substrate when applied to the substrate at low coat weight by offset lithographic printing, including upon application of only a single layer of the laser-imageable composition to a substrate by offset lithographic printing. The laser-imageable composition according to the present invention also advantageously demonstrates good environmental resistance, maintaining high contrast images over time.

It has been further surprisingly and advantageously found that the laser-imageable composition of the present invention can demonstrate an enhanced rheological profile during the offset lithographic printing process, resulting in improved smoothness of the laser-imageable composition when printed onto the desired substrate.

The terms "offset lithographic printing", "lithographic printing" and "offset printing" used herein refer to the modern printing technique well known to those skilled in the art. The terms may be used interchangeably by those in the art.

According to a first aspect of the present invention, there is provided a laser-imageable composition comprising:

(a) an oxyanion of a multivalent metal and (b) an oligomer;

wherein the oxyanion of a multivalent metal comprises particles having a $D_{50}$ particle size distribution of 10 μm or less.

The oxyanion of a multivalent metal may be any suitable oxyanion of a multivalent metal. Encompassed by the term "oxyanion of a multivalent metal" as used herein is also any oxyacid or hydrate of said oxyanion of a multivalent metal. The hydrate may be of the oxyanion of a multivalent metal, or of the corresponding oxyacid of the multivalent metal. The oxyanion of a multivalent metal, or corresponding oxyacid thereof, may also be anhydrous.

The oxyanion of a multivalent metal includes any suitable oxyanion of a multivalent metal (anionic component) present in conjunction with a cationic counterpart. The use of oxyanions of multivalent metals in compositions is disclosed in U.S. Pat. No. 7,485,403, the content of which is incorporated herein by reference. The anionic component may be an inorganic metal oxyanion compound such as molybdate including di-, tri-, hexa-, hepta-, octa- and deca-molybdates, tungstate, chromate, or analogous transition metal compound also in mixed oxidation states and of mixed inorganic metal oxyanions. Preferably, the accompanying cationic component is an alkali metal or an alkaline earth metal or ammonium. One example of an oxyanion of a multivalent metal is sodium molybdate. Preferred oxyanions of a multivalent metal are ammonium salts of inorganic metal oxyanion compounds. For example, ammonium paratungstate (APT). Particularly preferred as oxyanions of a multivalent metal are ammonium salts of oxyanions of molybdenum. A particularly preferred oxyanion of a multivalent metal is ammonium octamolybdate $(NH_4)_4Mo_8O_{28}$ or "AOM", which is a commercially available molybdenum composition with the CAS number 12411-64-2.

Preferably, the oxyanion of a multivalent metal is an ammonium salt of an oxyanion of a multivalent metal, such as an ammonium salt of an oxyanion of molybdenum. More preferably, the oxyanion of a multivalent metal is ammonium octamolybdate (AOM).

The oxyanion of a multivalent metal is the 'image-forming compound' of the laser-imageable composition. By 'image-forming compound' is meant that, following application of the laser-imageable composition to a substrate, the oxyanion of a multivalent metal will form a discernible contrasting image on the substrate upon exposure of the laser-imageable composition, and thus the oxyanion of a multivalent metal, to appropriate radiation. The discernible contrasting image is human and/or machine readable. In the context of the present invention, the discernible contrasting image will be black in colour, or a shade thereof, including greyscale, depending on the optical density of the black colour formed by the radiation. By "contrasting image", "high contrast image" or like terms used herein, is meant that the image formed at the part(s) of the laser-imageable composition that has been exposed to the radiation is distinct and easily differentiable from the background of the laser-imageable composition i.e. the part(s) of the laser-imageable composition that has not been exposed to the radiation, as well as any substrate visible therethrough. The laser-imageable composition may be white or off-white in colour upon formulation, application to the substrate and prior to exposure to the radiation. Accordingly, the part(s) of the laser-imageable composition that is not exposed to the radiation, i.e. the background of the laser-imageable composition, may remain white or off-white in colour. For the present invention, the effective formation of a high contrast image is demonstrated by a ΔODB (Δ optical density black) value. ΔODB is calculated as followed: 'absolute' ODB−'background' ODB. The 'absolute' ODB is a measure of the optical density of the black colour of the image. The higher the value, the darker the black colour formed. The 'background' ODB is a measure of the optical density of black colour of the background of the laser-imageable composition on the substrate, i.e. the part(s) of the laser-imageable composition that has not been exposed to the radiation, as well as any substrate visible therethrough. A ΔODB value is thus a measure of the difference in optical density of the black colour of the image relative to the unimaged part(s) of the laser-imageable composition. A higher ΔODB value indicates a more highly contrasting image. All ODB measurements can be made using an X-Rite eXact or SpectroEye spectrophotometer. For the present invention, a ΔODB value of 0.6 or greater is desired, such as 0.7 or greater, or even 0.8 or greater, and preferably 1.0 or greater. Such a value demonstrates formation of a high contrast image by the laser-imageable compositions of the present invention upon exposure to radiation following application of the laser-imageable composition to a substrate by offset lithographic printing.

The oxyanion of a multivalent metal comprises particles having a $D_{50}$ particle size distribution of 10 μm or less, such as 7 μm or less. It will be appreciated by a skilled person that the oxyanion of a multivalent metal is present in the laser-imageable composition in particulate form, the particles having a $D_{50}$ particle size distribution of 10 μm or less, such as 7 μm or less. Preferably, the particles of the oxyanion of a multivalent metal have a $D_{50}$ particle size distribution of 5 μm or less, such as 4.5 μm or less, such as 4 μm or less, or even 3.5 μm or less. More preferably, the particles of the oxyanion of a multivalent metal have a $D_{50}$ particle size distribution of 3 μm or less, such as 2.5 μm or less, or even 2.4 μm or less.

The particles of the oxyanion of a multivalent metal may have a $D_{50}$ particle size distribution in the range of from 0.5 to 10 μm, such as from 0.5 to 7 μm, or from 0.5 to 5 μm, or even from 1 to 4 μm, preferably from 2 to 3.5 μm, more preferably from 2 to 3 μm, and most preferably from 2.2 to 2.4 μm.

The particles of the oxyanion of a multivalent metal may have any suitable $D_{90}$ particle size distribution. It will be appreciated by a skilled person that the oxyanion of a multivalent metal is present in the laser-imageable composition in particulate form, the particles having any suitable $D_{90}$ particle size distribution.

Preferably, the $D_{90}$ particle size distribution of the particles of the oxyanion of a multivalent metal is 25 μm or less, such as 20 μm or less, or 15 μm or less, or 10 μm or less, or 9.5 μm or less, or even 9 μm or less. More preferably, the $D_{90}$ particle size distribution of the particles of the oxyanion of a multivalent metal is 8.5 μm or less, such as 8 μm or less.

The particles of the oxyanion of a multivalent metal may have any suitable $D_{10}$ particle size. It will be appreciated by a skilled person that the oxyanion of a multivalent metal is present in the laser-imageable composition in particulate form, the particles having any suitable $D_{10}$ particle size distribution. Preferably, the $D_{10}$ particle size distribution of the particles of the oxyanion of a multivalent metal is 4 μm or less, such as 3 μm or less, such as 2.5 μm or less, or even 2 μm or less. More preferably, the $D_{10}$ particle size distribution of the particles of the oxyanion of a multivalent metal is 1.5 μm or less, such as 1 μm or less.

It will be appreciated by a person skilled in the art that the $D_{50}$ particle size distribution of the particles of the oxyanion of a multivalent metal is low. As well as enabling the laser-imageable compositions of the present invention to be applied to substrates at reduced coat weights using offset lithographic printing, in particular such that only a single application of the laser-imageable composition may be required to facilitate high contrast image formation, the low particle size facilitates an improved rheological profile for the laser-imageable compositions of the present invention. Furthermore, the increased surface area of the particles of the oxyanion of a multivalent metal resulting from said particle size distribution values facilitates the production of an enhanced contrasting image upon exposure of the laser-imageable composition to radiation. Similar effects may also be seen when the particles of the oxyanion of a multivalent metal have the $D_{90}$ and $D_{10}$ particle size distributions detailed herein.

The terms "$D_{50}$" and "$D_{50}$ particle size distribution" as used herein refer to the median particle diameter of the particles of the oxyanion of a multivalent metal, i.e. the particle diameter at 50% of the cumulative distribution. This is the diameter above and below which 50% of the particle population is found. The terms "$D_{10}$" and "$D_{10}$ particle size distribution" as used herein refer to the 10th percentile median particle diameter, i.e. the diameter below which 10% of the particle population is found. The terms "$D_{90}$" and "$D_{90}$ particle size distribution" as used herein refer to the 90th percentile median particle diameter, i.e. the diameter below which 90% of the particle population is found.

It will be appreciated by a skilled person that particle size distribution measurements are made using the prepared laser-imageable composition when it is suitable for application to the substrate. The particles of the oxyanion of a multivalent metal are the only component of the prepared laser-imageable composition in particulate or particle form when it is suitable for application to the substrate. Particle size distribution measurements as specified or reported herein are as measured by the conventional Malvern Mastersizer™ 3000 particle size analyzer from Malvern Instruments in accordance with ISO 13320:2009. The $D_{50}$, $D_{90}$ and $D_{10}$ particle size distributions of the laser-imageable composition of the present invention are preferably measured within 1 month of formulation of the laser-imageable composition, such as within 2 weeks, and more preferably within 1 week of formulation of the laser-imageable composition.

The particles of the oxyanion of a multivalent metal of the present invention may have a surface area of 950 $m^2$/kg or more, such as 1200 $m^2$/kg or more, or 1500 $m^2$/kg or more, preferably 2000 $m^2$/kg or more, such as 2500 $m^2$/kg or more, such as 3000 $m^2$/kg or more, or even 3700 $m^2$/kg, and more preferably 4000 $m^2$/kg or more.

Surface area is measured using a Malvern Mastersizer according to ISO standard 13320:2009 that calculates the surface area from particle size distribution data. The surface area of the laser-imageable composition of the present invention is preferably measured within 1 month of formulation of the laser-imageable composition, such as within 2 weeks, and more preferably within 1 week of formulation of the laser-imageable composition.

The oxyanion of a multivalent metal may be present in the laser-imageable composition according to the present invention in any suitable amount. Preferably, the laser-imageable composition comprises from 40 to 70 wt %, such as from 30 to 60 wt % of the oxyanion of a multivalent metal, or even from 40 to 60 wt % of the oxyanion of a multivalent metal.

The laser-imageable composition according to the present invention comprises an oligomer. The oligomer of the laser-imageable composition may be any suitable oligomer for use in laser-imageable compositions for offset lithographic printing. The oligomer of the laser-imageable composition may be any suitable radiation-curable oligomer e.g. a UV-radiation curable oligomer. It is noted that the laser-imageable composition according to the present invention may comprise more than one oligomer.

The oligomer of the laser-imageable composition acts as a binder for the composition, enabling the composition to be suitable for use as a laser-imageable composition of the present invention. The presence of the oligomer thus facilitates the production of high contrast images using the laser-imageable composition of the present invention. Further, as discussed in more detail below, selection of the oligomer can enable the production of laser-imageable compositions having enhanced environmental resistance such that, as well as enabling the production of an image of increased contrast, this image may be maintained over time.

The oligomer may be a difunctional, trifunctional or tetrafunctional oligomer, or an oligomer of higher functionality. Preferably, the oligomer is a difunctional, trifunctional or tetrafunctional oligomer. More preferably, the oligomer is a difunctional or trifunctional oligomer. Most preferably, the oligomer is a difunctional oligomer. It is currently considered that selection of an oligomer having the specified functionality means that the laser-imageable compositions of the present invention can demonstrate enhanced environmental resistance, and a highly contrasting image may be formed upon application of radiation and maintained over time. This is particularly the case when the oligomer is a difunctional or trifunctional oligomer, and especially when the oligomer is a difunctional oligomer.

The functionality of the oligomer refers to its number of polymerisable groups. The functionality of the oligomer represents the number of bonds that an oligomer's repeating units forms in a polymer with other oligomers. The functionality of the oligomer affects the formation and the degree of crosslinking of polymers. The term "difunctional" and like terms used herein, refers to oligomers having two reactive sites i.e. two polymerisable groups on the oligomer, and capable of forming two bonds in a polymer with other oligomers. The term "trifunctional" and like terms used herein refers to oligomers having three reactive sites i.e. three polymerisable groups on the oligomer, and capable of forming three bonds in a polymer with other oligomers. The term "tetrafunctional" and like terms used herein refers to oligomers having four reactive sites i.e. four polymerisable groups on the oligomer, and capable of forming four bonds in a polymer with other oligomers. The term "higher functionality" refers to an oligomer having greater than four reactive sites, such as up to six reactive sites.

The oligomer may be selected from but not limited to the following: epoxy oligomers including modified epoxy oligomers; urethane oligomers; silane or silicon oligomers; (meth)acrylate oligomers including epoxy (meth)acrylate oligomers (e.g. vinylester oligomers) and modified epoxy (meth)acrylate oligomers (e.g. modified vinylester oligomers), alkyl (meth)acrylate oligomers such as methyl (meth) acrylate oligomers, polyether (meth)acrylate oligomers, polyester (meth)acrylate oligomers, acid-functional (meth) acrylate oligomers, amine (meth)acrylate oligomers; polyester urethane acrylate oligomers; and urethane (meth)acrylate oligomers.

"(Meth)acrylate" encompasses both acrylate and methacrylate, the brackets denoting optional usability of the constituent therein. Typically, when used herein, (meth) acrylate preferably refers to acrylate. It is noted that epoxy oligomers and epoxy (meth)acrylate oligomers include, but are not limited to: those formed by combining phenols and formaldehyde (novolac route); and those formed from an epoxy-group containing compound such as epichlorohydrin (ECH) and bisphenol-A (BPA), with the latter being optionally replaced with other materials such as aliphatic glycols, phenol and o-cresol novolacs. Further reaction with an acrylic-group containing compound such as (meth)acrylic acid may facilitate the formation of epoxy (meth)acrylate oligomers.

By "modified" as used herein in reference to epoxy oligomers and epoxy (meth)acrylate oligomers is meant that the epoxy-group of the epoxy oligomer or epoxy (meth) acrylate oligomer has undergone a further chemical modification (other than to produce the (meth)acrylate groups of the epoxy (meth)acrylate oligomer). Such chemical modifications may be brought about by reactions including, but not limited to: additional polymerisation reactions, dimerization, esterification and hydrogenations. It will be appreciated that these modifications will alter properties of reactivity, adhesion, flexibility, chemical resistance, hardness and shrinkage of the oligomers.

Specific examples of suitable oligomers include, but are not limited to those under the tradename 'Genomer' such as Genomer 3414 and 3480 (polyether acrylate oligomers), Genomer 5271 (amine acrylate oligomer), Genomer 2263 (epoxy acrylate oligomer (vinylester)), Genomer 2281 (modified epoxy acrylate oligomer), and Genomer 4312 (polyester urethane acrylate oligomer), all available from Rahn AG.

Preferably, the oligomer is selected from an epoxy oligomer, modified epoxy oligomer, urethane oligomer, polyether (meth)acrylate oligomer, polyester (meth)acrylate oligomer, epoxy (meth)acrylate oligomer, modified epoxy (meth)acrylate oligomer, polyester urethane (meth)acrylate oligomer and amine (meth)acrylate oligomer, or combinations thereof. More preferably, the oligomer is selected from a polyester (meth)acrylate oligomer, polyether (meth)acrylate oligomer, epoxy (meth)acrylate oligomer, modified epoxy (meth)acrylate oligomer, polyester urethane (meth) acrylate oligomer and amine (meth)acrylate oligomer, or combinations thereof. More preferably, the oligomer is selected from an epoxy (meth)acrylate oligomer, modified epoxy (meth)acrylate oligomer, polyester (meth)acrylate oligomer, polyether (meth)acrylate oligomer, and amine (meth) acrylate oligomer, or combinations thereof. More preferably, the oligomer is selected from an epoxy (meth)acrylate oligomer, modified epoxy (meth)acrylate oligomer, and amine (meth)acrylate oligomer, or combinations thereof. More preferably, the oligomer is selected from an epoxy (meth)acrylate oligomer and modified epoxy (meth)acrylate oligomer, or combinations thereof. Most preferably, the oligomer is an epoxy (meth)acrylate oligomer.

It is currently considered that such selection of the oligomer in terms of chemistry means that the laser-imageable compositions can demonstrate enhanced environmental resistance and a highly contrasting image may be formed upon application of radiation and maintained over time. This is particularly the case when the oligomer is selected from an epoxy (meth)acrylate oligomer, modified epoxy (meth) acrylate oligomer, and amine (meth)acrylate oligomer, or combinations thereof, especially when the oligomer is selected from an epoxy (meth)acrylate oligomer and modified epoxy (meth)acrylate oligomer, or combinations thereof, and more especially when the oligomer is an epoxy (meth)acrylate oligomer.

Preferably, the oligomer is selected from an epoxy oligomer, modified epoxy oligomer, urethane oligomer, polyether (meth)acrylate oligomer, polyester (meth)acrylate oligomer, epoxy (meth)acrylate oligomer, modified epoxy (meth)acrylate oligomer, polyester urethane (meth)acrylate oligomer and amine (meth)acrylate oligomer, or combinations thereof, and the oligomer is trifunctional or difunctional, preferably difunctional. More preferably, the oligomer is selected from a polyester (meth)acrylate oligomer, polyether (meth)acrylate oligomer, epoxy (meth)acrylate oligomer, modified epoxy (meth)acrylate oligomer, polyester urethane (meth)acrylate oligomer and amine (meth) acrylate oligomer, or combinations thereof, and the oligomer is difunctional or trifunctional, preferably difunctional. More preferably, the oligomer is selected from an epoxy (meth)acrylate oligomer, modified epoxy (meth)acrylate oligomer, polyester (meth)acrylate oligomer, polyether (meth) acrylate oligomer, and amine (meth)acrylate oligomer, or combinations thereof, and the oligomer is trifunctional or difunctional, preferably difunctional. More preferably, the oligomer is selected from an epoxy (meth)acrylate oligomer, modified epoxy (meth)acrylate oligomer, and amine (meth) acrylate oligomer, or combinations thereof, and the oligomer is trifunctional or difunctional, preferably difunctional. More preferably, the oligomer is selected from an epoxy (meth)acrylate oligomer and modified epoxy (meth)acrylate oligomer, or combinations thereof, and the oligomer is difunctional or trifunctional, preferably difunctional. More preferably, the oligomer is an epoxy (meth)acrylate oligomer, and the oligomer is difunctional or trifunctional, preferably difunctional. Most preferably, the oligomer is a difunctional epoxy (meth)acrylate oligomer. Such selection of the oligomer means that the laser-imageable composition can demonstrate enhanced environmental resistance and a highly contrasting image may be formed upon application of radiation and maintained over time. This is particularly the case when the oligomer is selected from an epoxy (meth) acrylate oligomer, modified epoxy (meth)acrylate oligomer, and amine (meth)acrylate oligomer, or combinations thereof, and the oligomer is difunctional, especially when the oligomer is selected from an epoxy (meth)acrylate oligomer and modified epoxy (meth)acrylate oligomer, or combination thereof, and the oligomer is difunctional, more especially when the oligomer is an epoxy (meth)acrylate oligomer, and the oligomer is difunctional, and even more especially when the oligomer is a difunctional epoxy (meth) acrylate oligomer.

The oligomer may be present in the laser-imageable composition according to the present invention in any suitable amount. Preferably, the laser-imageable composition comprises from 10 to 50 wt %, such as from 20 to 50 wt %, or even 25 to 45 wt % of the oligomer.

The laser-imageable composition according to the present invention may further comprise a monomer. It has been advantageously found that, when present, the monomer can facilitate the production of high quality high contrast images upon application of radiation to the laser-imageable composition. Furthermore, the presence of a monomer in the laser-imageable composition of the present invention enables a broader range of oligomers to be utilised, in particular with respect to viscosity. As discussed in more detail below, oligomers of increased viscosity may be utilised. The use of monomers in combination with oligomers in laser-imageable compositions of the present invention can enhance the rheological profile of the laser-imageable compositions during the offset lithographic printing process, resulting in improved smoothness when applied to the desired substrate. Oligomers of higher viscosities enable an enhanced rheological profile to be achieved, i.e. a greater shear thinning effect is demonstrated. The monomer may be any suitable monomer for use in a laser-imageable composition for offset lithographic printing. The monomer of the laser-imageable composition may be any suitable radiation-curable monomer, e.g. a UV radiation curable monomer. It is noted that the laser-imageable composition according to the present invention may comprise more than one monomer.

It is currently further considered that the presence of a monomer also further enhances the hardness, flexibility, gloss, chemical resistance and adhesion properties of the laser-imageable compositions of the present invention.

The monomer may be a monofunctional, difunctional, trifunctional or tetrafunctional monomer, or a monomer of higher functionality. Preferably, the monomer is a difunctional, trifunctional or tetrafunctional monomer, or a monomer of higher functionality. More preferably, the monomer is a difunctional or trifunctional monomer. Most preferably, the monomer is a difunctional monomer. Such selection of the monomer is considered to be advantageous in facilitating the production of high quality highly contrasting images, and further contributing to improved hardness, flexibility, gloss, chemical resistance and adhesion properties of the laser-imageable compositions of the present invention. This is particularly the case when the monomer is selected to be a difunctional or trifunctional monomer, especially when the monomer is selected to be a difunctional monomer.

The functionality of the monomer refers to its number of polymerisable groups. The functionality of the monomer represents the number of bonds that a monomer's repeating unit forms in a polymer with other monomers. The functionality of the monomer affects the formation and the degree of crosslinking of polymers. The term "monofunctional" and like terms used herein, refers to monomer(s) having only one reactive site, i.e. one polymerisable group on the monomer, and capable of forming one bond in a polymer with other monomers. The term "difunctional" and like terms used herein, refers to monomers having two reactive sites i.e. two polymerisable groups on the monomer, and capable of forming two bonds in a polymer with other monomers. The term "trifunctional" and like terms used herein refers to monomers having three reactive sites i.e. three polymerisable groups on the monomer, and capable of forming three bonds in a polymer with other monomers. The term "tetrafunctional" and like terms used herein refers to monomers having four reactive sites i.e. four polymerisable groups on the monomer, and capable of forming four bonds in a polymer with other monomers. The term "higher functionality" refers to a monomer having a greater than four reactive sites, such as up to six reactive sites.

Suitable monomers include (meth)acrylate monomers including, but not limited to: acrylated epoxy monomers, acrylated polyurethane monomers, acrylated polyester monomers, acrylated epoxidised oil monomers, acrylated polyether monomers, and mixtures thereof. For example, suitable monomers include, but are not limited to: monofunctional (meth)acrylate monomers such as caprolactone acrylate (CA), phenoxy benzyl acrylate (PBA), 0-phenylphenol EO acrylate (OPPEA), 4-tert-butylcyclohexyl acrylate (TBCHA), benzyl acrylate (BZA), biphenylmethyl acrylate (BPMA), tetrahydrofurfuryl acrylate (THFA), ethoxy ethoxy ethyl acrylate (EOEOA), stearyl acrylate (SA), octadecyl acrylate (ODA), cyclic trimethylolpropane formal acrylate (CFTA), ethoxylated 4 nonyl phenol acrylate (NP4EOA), 3,3,5-Trimethylcyclohexyl Acrylate (TMCHA), isobornyl methacrylate (IBOMA), isobornyl acrylate (IBOA), lauryl acrylate (LA), isodecyl acrylate (IDA), Phenol (EO) acrylate (PH(EO)A), nonylphenol(EO)4 acrylate (NP(EO)4A), nonylphenol(EO)8 acrylate (NP(EO)8A), 2-(2-Ethoxyethoxy)ethyl acrylate (EOEOA), benzyl methacrylate (BZMA), isodecyl methacrylate (IDMA), phenoxyethyl methacrylate (PHEMA), tetrahydrofurfuryl methacrylate (THFMA), stearyl methacrylate (SMA), methoxy PEG600 methacrylate (MPEG600MA), phenoxy ethyl acrylate (PEA); difunctional (meth)acrylate monomers such as 1,6-hexanediol dimethacrylate (HDDMA), 1,4-butanediol dimethacrylate (BDDMA), neopentyl glycol dimethacrylate (NPGDMA), ethylene glycol dimethylacrylate (EGDMA), diethylene glycol dimethacrylate (DEGDMA), triethylene glycol dimethacrylate (TEGDMA), t etraethylene glycol dimethacrylate (T4EGDMA), bisphenol A $(EO)_3$ dimethacrylate (BPA$(EO)_3$DMA), bisphenol A $(EO)_4$ dimethacrylate (BPA$(EO)_4$DMA), bisphenol A $(EO)_{10}$ dimethacrylate (BPA(EO)10DMA), bisphenol A $(EO)_{30}$ dimethacrylate (BPA(EO)30DMA), 1,3-butylene glycol dimethacrylate (BGDMA), polyethylene glycol 200 dimethacrylate (PEG200DMA), polyethylene glycol 400 dimethacrylate (PEG400DMA), ethoxylated polypropylene glycol dimethacrylate (PPG700(EO)6DMA); trifunctional (meth)acrylate monomers such as trimethylolpropane triacrylate (TPMTA), trimethylolpropane $(EO)_3$ triacrylate (TMP(EO)3TA), trimethylolpropane $(EO)_6$ triacrylate (TMP(EO)6TA), trimethylolpropane $(EO)_9$ triacrylate (TMP(EO)9TA), trimethylolpropane $(EO)_{15}$ triacrylate (TMP(EO)15TA), glycerine $(PO)_3$ triacrylate (GPTA), pentaerythritol acrylate (PETA), trimethylolpropane $(PO)_3$ triacrylate (TMP(PO)3TA), tris(2-hydroxyehtyl)isocyanurate triacrylate (THEICTA), trimethylolpropane trimethylacrylate (TMPTMA), ethoxylated $(EO)_5$ pentaerythritol tetraacrylate (PPTTA), trimethylolpropane triacrylate (TMPT A); and tetrafunctional (meth)acrylate monomers or those of higher functionality such as pentaerythritol $(EO)_n$ tetraacrylate (PE(EO)nTTA), ditrimethylolpropane tetraacrylate (DTMPTTA), pentaerythritol tetraacrylate (PETTA), di pentaerythritol pentaacrylate (DPPA), dip entaerythritol hexaacrylate (DPHA).

"EO" as used herein refers to an ethoxy group, with any subsequent subscript number indicating the number of ethoxy groups chained together. "$EO_n$" refers to a product comprising a mixture of ethoxy chain lengths.

Specific examples of suitable monomers include, but are not limited to: commercially available acrylated polyether monomers such as Laromer TPGDA (tripropylene glycol diacrylate) available from BASF, those under the tradename 'Miramer' such as Miramer M320 (glycerylpropoxy triacrylate—GPTA), Miramer M3130 (trimethylpropane $EO_3$ triacrylate—TMP$(EO)_3$TA), and Miramer M3190 (trimethylolpropane $EO_9$ triacrylate—TMP$(EO)_9$TA); commercially available acrylated polyester monomers including those under the tradename Miramer M300 (trimethylolpropane triacrylate—TMPTA) available from Rahn AG; and commercially available aliphatic acrylate monomers such as those under the tradename Miramer M122 (lauryl acrylate—LA).

As discussed above, selection of the monomer enables a broader range of oligomers to be utilised, and can facilitate the production of highly contrasting images of high quality. Preferably, the monomer is selected from tripropylene glycol diacrylate (TPGDA), glycerylpropoxy triacrylate (GPTA), trimethylolpropane triacrylate (TMPTA), lauryl acrylate (LA), trimethylolpropane $(EO)_3$ triacrylate (TMP $(EO)_3$TA) and trimethylolpropane $(EO)_9$ triacrylate (TMP $(EO)_9$TA). More preferably, the monomer is selected from tripropylene glycol diacrylate (TPGDA), glycerylpropoxy triacrylate (GPTA), trimethylolpropane triacrylate (TMPTA), trimethylolpropane $(EO)_3$ triacrylate (TMP$(EO)_3$TA) and trimethylolpropane $(EO)_9$ triacrylate (TMP$(EO)_9$TA). Most preferably, the monomer is tripropylene glycol diacrylate (TPGDA).

Such selection of the monomer enables the production of particularly high quality contrasting images upon application of the radiation to the laser-imageable composition. This is particularly the case for when the monomer is selected to be is tripropylene glycol diacrylate (TPGDA).

Preferably, when the monomer is present in the laser-imageable composition according to the present invention, the oligomer is selected from an epoxy (meth)acrylate oligomer, modified epoxy (meth)acrylate oligomer, and an amine (meth)acrylate oligomer, or combinations thereof, and the monomer is selected from tripropylene glycol diacrylate (TPGDA), glycerylpropoxy triacrylate (GPTA), trimethylolpropane triacrylate (TMPTA), lauryl acrylate (LA), trimethylolpropane $(EO)_3$ triacrylate (TMP$(EO)_3$TA) and trimethylolpropane $(EO)_9$ triacrylate (TMP$(EO)_9$TA). More preferably, the oligomer is selected from an epoxy (meth)acrylate oligomer and modified epoxy (meth)acrylate oligomer, or combination thereof, and the monomer is selected from tripropylene glycol diacrylate (TPGDA), glycerylpropoxy triacrylate (GPTA), trimethylolpropane triacrylate (TMPTA), lauryl acrylate (LA), trimethylolpropane $(EO)_3$ triacrylate (TMP$(EO)_3$TA) and trimethylolpropane $(EO)_9$ triacrylate (TMP$(EO)_9$TA). More preferably, the oligomer is selected from an epoxy (meth)acrylate oligomer and modified epoxy (meth)acrylate oligomer, or combination thereof, and the monomer is selected from tripropylene glycol diacrylate (TPGDA), glycerylpropoxy triacrylate (GPTA), trimethylolpropane triacrylate (TMPTA), trimethylolpropane $(EO)_3$ triacrylate (TMP$(EO)_3$TA) and trimethylolpropane $(EO)_9$ triacrylate (TMP$(EO)_9$TA). More preferably, the oligomer is an epoxy (meth)acrylate oligomer, and the monomer is selected from tripropylene glycol diacrylate (TPGDA), glycerylpropoxy triacrylate (GPTA), trimethylolpropane triacrylate (TMPTA), trimethylolpropane $(EO)_3$ triacrylate (TMP$(EO)_3$TA) and trimethylolpropane $(EO)_9$ triacrylate (TMP$(EO)_9$TA). More preferably, the oligomer is an epoxy (meth)acrylate oligomer, and the monomer is tripropylene glycol diacrylate (TPGDA). The selection of the stated oligomers and monomers enables the production of high quality highly contrasting images upon application of the radiation to the laser-imageable composition. In addition, the selection of the stated oligomers and monomers means that the laser-imageable composition can demonstrate enhanced environmental resistance and a highly contrasting image is formed upon application of radiation and maintained over time. The laser-imageable compositions typically also demonstrate improved hardness, flexibility, gloss, chemical resistance and adhesion properties upon selection of such oligomers and monomers. This is particularly the case when the oligomer is selected to be an epoxy (meth) acrylate oligomer and the monomer is selected from tripropylene glycol diacrylate (TPGDA), glycerylpropoxy triacrylate (GPTA), trimethylolpropane triacrylate (TMPTA), trimethylolpropane $(EO)_3$ triacrylate (TMP$(EO)_3$TA) and trimethylolpropane $(EO)_9$ triacrylate (TMP$(EO)_9$TA), especially when the oligomer is selected to be an epoxy (meth) acrylate oligomer and the monomer is tripropylene glycol diacrylate (TPGDA).

Preferably, when the monomer is present in the laser-imageable composition according to the present invention, the oligomer is selected from a difunctional or trifunctional oligomer, preferably difunctional oligomer, such as a difunctional or trifunctional epoxy (meth)acrylate oligomer, modified epoxy (meth)acrylate oligomer, and amine (meth)acrylate oligomer, or combinations thereof, and the monomer is selected from a difunctional or trifunctional monomer, such as tripropylene glycol diacrylate (TPGDA), glycerylpropoxy triacrylate (GPTA), trimethylolpropane triacrylate (TMPTA), trimethylolpropane $(EO)_3$ triacrylate (TMP$(EO)_3$TA) and trimethylolpropane $(EO)_9$ triacrylate (TMP$(EO)_9$TA). More preferably, the oligomer is selected from a difunctional or trifunctional oligomer, preferably difunctional oligomer, such as a difunctional or trifunctional epoxy (meth)acrylate oligomer and modified epoxy (meth) acrylate oligomer, or combination thereof, and the monomer is selected from a difunctional or trifunctional monomer, such as tripropylene glycol diacrylate (TPGDA), glycerylpropoxy triacrylate (GPTA), trimethylolpropane triacrylate (TMPTA), trimethylolpropane $(EO)_3$ triacrylate (TMP$(EO)_3$TA) and trimethylolpropane $(EO)_9$ triacrylate (TMP$(EO)_9$TA). More preferably, the oligomer is a difunctional oligomer such as a difunctional epoxy (meth)acrylate oligomer, and the monomer is selected from tripropylene glycol diacrylate (TPGDA), glycerylpropoxy triacrylate (GPTA), trimethylolpropane triacrylate (TMPTA), trimethylolpropane $(EO)_3$ triacrylate (TMP$(EO)_3$TA) and trimethylolpropane $(EO)_9$ triacrylate (TMP$(EO)_9$TA). More preferably, the oligomer is a difunctional epoxy (meth)acrylate oligomer, and the monomer is tripropylene glycol diacrylate (TPGDA). The selection of the stated oligomers and monomers enables the production of high quality highly contrasting images upon application of the radiation to the laser-imageable composition. In addition, the selection of the stated oligomers and monomers means that the laser-imageable composition can demonstrate enhanced environmental resistance and a highly contrasting image is formed upon application of radiation and maintained over time. The laser-imageable compositions typically also demonstrate improved hardness, flexibility, gloss, chemical resistance and adhesion properties upon selection of such oligomers and monomers. This is particularly the case when the oligomer is selected to be a difunctional epoxy (meth) acrylate oligomer and the monomer is selected from tripropylene glycol diacrylate (TPGDA), glycerylpropoxy triacrylate (GPTA), trimethylolpropane triacrylate (TMPTA), trimethylolpropane $(EO)_3$ triacrylate ($TMP(EO)_3TA$) and trimethylolpropane $(EO)_9$ triacrylate ($TMP(EO)_9TA$), especially when the oligomer is selected to be a difunctional epoxy (meth)acrylate oligomer and the monomer is tripropylene glycol diacrylate (TPGDA).

The monomer may be present in the laser-imageable composition according to the present invention in any suitable amount. Preferably, when present, the laser-imageable composition comprises from 10 to 50 wt %, such as from 10 to 40 wt %, or even from 10 to 30 wt %, or 10 to 25 wt % of the monomer.

The oligomer of the laser-imageable composition of the present invention is selected such that the print viscosity of the laser-imageable composition is at a level appropriate for offset lithographic printing. Additionally, the oligomer of the laser-imageable composition is selected for its ability to enable wetting, dispersion suspension and stabilisation of the oxyanion of a multivalent metal therein.

The print viscosity of the laser-imageable composition of the present invention may be from 10 to 600 Pa-s (10,000 to 600,000 cP), such as from 55 to 500 Pa-s (55,000 to 500,000 cP), or even from 80 to 400 Pa-s (80,000 to 400,000 cP). Preferably, the print viscosity is from 100 to 400 Pa-s (100,000 to 400,000 cP), and more preferably from 100 to 300 Pa-s (100,000 to 300,000 cP). It will be appreciated by a skilled person that these print viscosity ranges are suitable for use in offset lithographic printing.

The print viscosity of the laser-imageable composition of the present invention is measured at 22° C. The print viscosity is measured using a Brookfield DV2T Viscometer. Typically, the no. 7 spindle (RV spindle set) is used, and the speed of rotation is selected as appropriate for the individual laser-imageable composition. Typically, the speed of rotation is selected from speeds of 2, 10, 12, 20, 40, 60 and 100 rpm. The print viscosity is the viscosity of the laser-imageable composition when it is suitable for application to the substrate, i.e. suitable for application to the substrate by offset lithographic printing. The print viscosity of the laser-imageable composition of the present invention is preferably measured within 1 month of formulation of the laser-imageable composition, such as within 2 weeks, and more preferably within 1 week of formulation of the laser-imageable composition.

As discussed above, the laser-imageable composition of the present invention may further comprise a monomer. It will be appreciated by a skilled person that as well as the viscosity of the oligomer, the viscosity of this optional monomer also contributes to the overall print viscosity of the laser-imageable composition. Accordingly, the viscosity of the oligomer utilised in the laser-imageable composition of the present invention may vary depending on the presence/absence of the monomer in the laser-imageable composition. As discussed above, the presence of a monomer in the laser-imageable composition of the present invention enables a broader range of oligomers to be used, in particular those of increased viscosities. This enhances the rheological profile of the laser-imageable compositions of the present invention during the offset lithographic printing process, resulting in improved smoothness when applied to the desired substrate.

When the laser-reactive composition of the present invention does not comprise a monomer, the oligomer may typically have a viscosity of 200 Pa-s or less (200,000 cP or less), such as 160 Pa-s or less (160,000 cP or less), or 100 Pa-s or less (100,000 cP or less), and preferably 80 Pa-s or less (80,000 cP or less). When the laser-reactive composition of the present invention does not comprise a monomer, the lower limit of the viscosity of the oligomer may be 1 Pa-s (1,000 cP), preferably 3 Pa-s (3,000 cP), such that the oligomer may have a viscosity of from 1 to 200 Pa-s (1,000 to 200,000 cP), such as from 1 to 160 Pa-s (1,000 to 160,000 cP), or from 1 to 100 Pa-s (1,000 to 100,000 cP), and preferably from 1 to 80 Pa-s (1,000 to 80,000 cP), or the oligomer may have a viscosity of from 3 to 200 Pa-s (3,000 to 200,000 cP), such as from 3 to 160 Pa-s (3,000 to 160,000 cP), or from 3 to 100 Pa-s (3,000 to 100,000 cP), and preferably from 3 to 80 Pa-s (3,000 to 80,000 cP). Alternatively, when the laser-imageable composition of the present invention further comprises a monomer, the viscosity of the oligomer may be greater than when a monomer is absent from the laser-imageable composition. Therefore, when the laser-imageable composition of the present invention further comprises a monomer, the oligomer may have a viscosity of 50 Pa-s or more (50,000 cP or more), such as 100 Pa-s or more (100,000 cP or more), or 200 Pa-s or more (200,000 cP or more), or even 1,000 Pa-s or more (1,000,000 cP or more). It will be appreciated by a skilled person that, when a monomer is present in the laser-imageable composition, a balance is achieved between the viscosities of the oligomer and monomer components such that the print viscosity of the laser-imageable composition is suitable for use in offset lithographic printing.

The viscosity of the oligomer is measured at 25° C. The viscosity of the oligomer may be measured using a Brookfield DV2T Viscometer. The spindle and speed of rotation is selected as appropriate for the individual oligomer. The no. 7 spindle (RV spindle set) may be used, and the speed of rotation may be selected from speeds of 2, 10, 12, 20, 40, 60 and 100 rpm.

It will therefore be appreciated that within the scope of the present invention, there is encompassed both: (a) a laser-imageable composition comprising an oxyanion of a multivalent metal comprising particles having a $D_{50}$ particle size distribution of 10 μm or less and an oligomer, wherein the oligomer may have a viscosity of 200 Pa-s or less (200,000 cP or less), such as 160 Pa-s or less (160,000 cP or less), or 100 Pa-s or less (100,000 cP or less), or 80 Pa-s o less (80,000 cP or less), and (b) a laser-imageable composition comprising an oxyanion of a multivalent metal comprising particles having a $D_{50}$ particle size distribution of 10 μm or less, an oligomer and a monomer, wherein the oligomer may have a viscosity of 50 Pa-s or more (50,000 cP or more), such as 100 Pa-s or more (100,000 cP or more), or 200 Pa-s or more (200,000 cP or more), or even 1,000 Pa-s or more (1,000,000 cP or more).

The monomer of the laser-imageable composition of the present invention is selected such that the print viscosity of the laser-imageable composition is maintained at a level appropriate for offset lithographic printing. It will be appreciated by a skilled person that a balance is achieved between the viscosities of the oligomer and monomer components such that the print viscosity of the laser-imageable composition is suitable for use in offset lithographic printing, i.e. the monomer may be introduced into a laser-imageable composition to ensure the print viscosity is adjusted to that acceptable for offset lithographic printing. Furthermore, as discussed above, the presence of a monomer in the laser-imageable composition of the present invention enables a broader range of oligomers to be used, in particular those of increased viscosities. This enhances the rheological profile of the laser-imageable compositions of the present invention during the offset lithographic printing process, resulting in improved smoothness when applied to the desired substrate.

The monomer utilised in the laser-reactive composition according to the present invention may typically have a viscosity of 1.8 Pa-s or less (1,800 cP or less), preferably 0.8 Pa-s or less (800 cP or less), or even 0.1 Pa-s or less (100 cP or less), such as 0.05 Pa-s (50 cP or less), and more preferably 0.02 Pa-s or less (20 cP or less). The monomer utilised in the laser-reactive composition according to the present invention may have a lower viscosity limit of 0.01 Pa-s (10 cP), preferably 0.015 Pa-s (15 cP), such that the monomer may have a viscosity of from 0.01 to 1.8 Pa-s (10 to 1,800 cP), preferably from 0.01 to 0.8 Pa-s (10 to 800 cP), or even from 0.01 to 0.1 Pa-s (10 to 100 cP), such as from 0.01 to 0.05 Pa-s (10 cP to 50 cP), and more preferably from 0.01 to 0.02 Pa-s (10 to 20 cP), or the monomer may have a viscosity of from 0.015 to 1.8 Pa-s (15 to 1,800 cP), preferably from 0.015 to 0.8 Pa-s (15 to 800 cP), or even from 0.015 to 0.1 Pa-s (15 cP to 100 cP), such as from 0.015 to 0.05 Pa-s (15 cP to 50 cP), and more preferably from 0.015 to 0.02 Pa-s (15 cP to 20 cP). As noted above, it is preferable to utilise a monomer of low viscosity in order to enable oligomers of higher viscosities to be utilised in the laser-imageable compositions of the present invention. As well as facilitating the formation of high quality high contrast images by the laser-imageable composition of the present invention upon application of radiation thereto, when oligomers of higher viscosities are utilised, the rheological profile of the laser-imageable compositions may be increased. The combination of an oligomer of higher viscosity and a monomer of lower viscosity is beneficial to the printing and laser-imaging performance of the laser-imageable compositions of the present invention.

Preferably, the monomer is selected from tripropylene glycol diacrylate (TPGDA), glycerylpropoxy triacrylate (GPTA), trimethylolpropane triacrylate (TMPTA), lauryl acrylate (LA), trimethylolpropane $(EO)_3$ triacrylate (TMP $(EO)_3$TA) and trimethylolpropane $(EO)_9$ triacrylate (TMP $(EO)_9$TA), and has a viscosity of from 0.01 to 1.8 Pa-s (10 to 1,800 cP), preferably from 0.01 to 0.8 Pa-s (10 to 800 cP), or even from 0.01 to 0.1 Pa-s (10 to 100 cP), such as from 0.01 to 0.05 Pa-s (10 cP to 50 cP), and more preferably from 0.01 to 0.02 Pa-s (10 to 20 cP). More preferably, the monomer is selected from tripropylene glycol diacrylate (TPGDA), glycerylpropoxy triacrylate (GPTA), trimethylolpropane triacrylate (TMPTA), trimethylolpropane $(EO)_3$ triacrylate (TMP$(EO)_3$TA) and trimethylolpropane $(EO)_9$ triacrylate (TMP$(EO)_9$TA), i.e. a difunctional or trifunctional monomer, and has a viscosity of from 0.01 to 0.1 Pa-s (10 to 100 cP), such as from 0.01 to 0.05 Pa-s (10 cP to 50 cP), and more preferably from 0.01 to 0.02 Pa-s (10 to 20 cP). Most preferably, the monomer is tripropylene glycol diacrylate (TPGDA), i.e. a difunctional monomer, and has a viscosity of from 0.01 to 0.05 Pa-s (10 cP to 50 cP), and more preferably from 0.01 to 0.02 Pa-s (10 to 20 cP).

Preferably, the monomer is selected from tripropylene glycol diacrylate (TPGDA), glycerylpropoxy triacrylate (GPTA), trimethylolpropane triacrylate (TMPTA), lauryl acrylate (LA), trimethylolpropane $(EO)_3$ triacrylate (TMP $(EO)_3$TA) and trimethylolpropane $(EO)_9$ triacrylate (TMP $(EO)_9$TA), and has a viscosity of from from 0.015 to 0.8 Pa-s (15 to 800 cP), or even from 0.015 to 0.1 Pa-s (15 cP to 100 cP), such as from 0.015 to 0.05 Pa-s (15 cP to 50 cP), preferably from 0.015 to 0.02 Pa-s (15 cP to 20 cP). More preferably, the monomer is selected from tripropylene glycol diacrylate (TPGDA), glycerylpropoxy triacrylate (GPTA), trimethylolpropane triacrylate (TMPTA), trimethylolpropane $(EO)_3$ triacrylate (TMP$(EO)_3$TA) and trimethylolpropane $(EO)_9$ triacrylate (TMP$(EO)_9$TA), i.e. a difunctional or trifunctional monomer, and has a viscosity of from 0.015 to 0.1 Pa-s (15 cP to 100 cP), such as from 0.015 to 0.05 Pa-s (15 cP to 50 cP), preferably from 0.015 to 0.02 Pa-s (15 cP to 20 cP). Most preferably, the monomer is tripropylene glycol diacrylate (TPGDA), i.e. a difunctional monomer, and has a viscosity of from 0.015 to 0.05 Pa-s (15 cP to 50 cP), preferably from 0.015 to 0.02 Pa-s (15 cP to 20 cP).

The viscosity of the monomer is measured at 25° C. The viscosity of the monomer may be measured using a Brookfield DV2T Viscometer. The spindle and speed of rotation is selected as appropriate for the individual monomer. The no. 7 spindle (RV spindle set) may be used, and the speed of rotation may be selected from speeds of 2, 10, 12, 20, 40, 60 and 100 rpm.

The laser-imageable composition according to the invention may further comprise a stabiliser. It is noted that the laser-imageable composition may comprise more than one stabiliser. Suitable stabilisers include, but are not limited to the following: hydroquinone, methoxy methyl hydroquinone, 4-benzoquinone, 4-methoxyphenol (mequinol), phenothiazine, mono-tert-butyl hydroquinone, catechol, 4-tert-butyl catechol, benzoquinone, 2,5 di tert-butyl hydroquinone, 2,5-p-dimethyl p-benzoquinone, anthraquinone, 2,6-di-tert-butyl hydroxy toluene, organo phosphites, methacrylated phosphate esters, 4-hydroxyanisole, tris(N-hydroxy-N-nitrosophenylaminato-O,O')aluminium, 2-phenoxy phenyl acrylate and HALS (Hindered Amine Light Stabilisers) compounds including derivatives of tetramethylpiperidine, or combinations thereof.

Suitable stabilisers also include commercially available stabiliser products such as Genorad 20, commercially available from Rahn AG. Such commercially available stabiliser products may also comprise a carrier for the stabiliser(s), capable of dissolving the stabiliser(s) therein.

The stabiliser may be present in the laser-imageable composition according to the present invention in any suitable amount. Preferably, when present, the laser-imageable composition comprises from 0.1 to 5 wt %, such as from 0.1 to 3 wt %, or even from 0.1 to 1 wt % of the stabiliser.

The laser-imageable composition according to the present invention may further comprise a photoinitiator. It is noted that the laser-imageable composition may comprise more than one photoinitiator. Suitable photoinitiators include, but are not limited to the following: Norrish Type I photoinitiators such as phosphine oxides, hydroxyacetophenones, aminoacetophenones and benzil ketals; Norrish Type II photoinitiators including benzyl formates, substituted benzophenones, benzophenones and thioxanthones; and hydrid Norrish Type I/II photoinitiators such as benzophenone phosphine oxides. It will be appreciated by a skilled person that the Norrish Type II photoinitiators may be utilised either alone or in conjunction with an amine synergist as a hydrogen donor. Preferably, the photoinitiator is selected from a Norrish Type I photoinitiator or hybrid Norrish Type I/II photoinitiator. More preferably, the photoinitiator is a Norrish Type I photoinitiator such as a hydroxyacetophenone or phosphine oxide. More preferably, the photoinitiator is a phosphine oxide. Most preferably, the photoinitiator is diphenyl(2,4,6-trimethylbenzoyl)phosphine oxide (TPO).

The term "Norrish Type I photoinitiator" as used herein refers to photoinitiators characterized by a cleavage reaction into two radical fragments of the original photoinitiator. Irradiation with UV-light leads to a homolytic bondage cleavage and generation of two highly reactive radical species. These radicals then initiate the polymerization. The Norrish Type I photoinitiator is irreversibly incorporated into the polymer matrix. Examples of Norrish Type I photoinitiators include, but are not limited to: 2-hydroxy-2-methyl-1-phenylpropanone (SpeedCure 73), 1-hydroxycyclohexyl phenyl ketone (SpeedCure 84), 1,[4-(2-hydroxyethoxy)-phenyl]-2-hydroxy-2-methyl-1-propane-1-one (SpeedCure 2959), 2,2-dimethoxy-1,2-phenylacetophenone (SpeedCure BKL), 2-methyl-1-[4-(methylthio)phenyl]2-morpholinopropan-1-one (SpeedCure 97), 2-benzyl-2-dimethylamino-4-morpholinobutyrophenone (SpeedCure BDM B), 2,4,6-trimethylbenzoyldiphenylphosphine oxide (SpeedCure TPO), ethyl 2,4,6-trimethylbenzoyl phenyl phosphinate (SpeedCure TPO-L) and phenyl bis(2,4,6-trimethylbenzoyl)-phosphine oxide (SpeedCure BPO), all commercially available from Lambson.

The term "Norrish Type II photoinitiator" as used herein refers to photoinitiators that when irradiated by UV-light, need a hydrogen donor (co-initiator) to react. Most commonly these hydrogen donors are amines (amine synergists). By UV-irradiation the Norrish Type II photoinitiator abstracts a hydrogen atom from the employed synergist forming two radicals. These radicals, like the Norrish Type I photoinitiators, can then initiate the polymerization reaction. Norrish Type II photoinitiators normally are not incorporated during the reaction but the synergist is. Examples of Norrish Type II photoinitiators include, but are not limited to: benzophenone (SpeedCure BP), 4-methylbenzophenone (SpeedCure MBP), methyl-2-benzoylbenzoate (SpeedCure MBB), 4,4'-bis(diethylamino)benzophenone (SpeedCure EMK), 4-benzoyl-4'-methyldiphenyl sulphide (SpeedCure BMS), 4-phneylbenzophenone (SpeedCure PBZ), 2-isopropylthioxanthone (SpeedCure 2-ITX), 1-chloro-4-propoxythioxanthone (SpeedCure CPTX), 2,4-diethylthioxanthone (SpeedCure DETX), methylbenzoylformate (SpeedCure MBF), polymeric benzophenone (SpeedCure 7005) and polymeric thioxanthone (SpeedCure 7010), all commercially available from Lambson. Examples of suitable amine synergists include, but are not limited to: 2-butoxyethyl-4-(dimethylamino)benzoate (SpeedCure BEDB), 2-(dimethylamino)ethylbenzoate (SpeedCure DMB), ethyl-4-(dimethylamino)benzoate (SpeedCure EDB), 2-ethylhexyl-4-(dimethylamino)benzoate (SpeedCure EHA), 4,4'-bis(diethylamino)benzophenone (SpeedCure EMK) and a polymeric amine synergist (SpeedCure 7040), all commercially available from Lambson.

The term "Norrish Type I/II photoinitiator" as used herein refers to a hybrid of both Norrish Type I and 11 photoinitiators. Such photoinitiators can produce radicals through homolytic bond cleavage as well as through hydrogen abstraction to produce radicals. A suitable example of a Norrish Type I/II photoinitiator is ethyl(3-benzoyl-2,4,6-trimethylbenzoyl)(phenyl)phosphinate (SpeedCure XKM), commercially available from Lambson.

The photoinitiator may be present in the laser-imageable composition according to the present invention in any suitable amount. Preferably, when present, the laser-imageable composition comprises from 1 to 10 wt %, such as from 1 to 8 wt %, or even from 2 to 6 wt % of the photoinitiator.

The ratio of stabiliser to photoinitiator present in the laser-imageable composition may be from 1:3 to 1:9, such as from 1:3 to 1:6, or from 1:4 to 1:5. Preferably, the ratio of stabiliser to photoinitator is 1:4. Such a ratio enables easier curing of the composition, whilst also providing improved long term storage stability for the composition.

The laser-imageable composition according to the present invention may further comprise a near-infrared radiation (NIR) absorber. It will be appreciated by a skilled person that an NIR absorber is typically utilised when NIR radiation is utilised to facilitate formation of an image, the NIR absorber being capable of enhancing the absorption of the NIR radiation. Examples of suitable NIR absorbers include, but are not limited to the following: inorganic copper salts such as copper (II) hydroxide phosphate (CHP); organic NIR dyes and pigments such as N,N,N',N'-tetrakis(4-dibutylaminophenyl)-p-benzoquinone bis(iminium hexafluoro-antimonate); non-stoichiometric inorganic compounds such as reduced indium tin oxide, reduced zinc oxide, reduced tungsten oxide (tungsten bronze), reduced doped tungsten oxide including an inorganic compound of the following formula MxWyOz (where M is at least one element selected from the group consisting of H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, TI, Si, Ge, Sn, Pb, Sb, B, F, P, S, Se, Br, Te, Ti, Nb, V, Mo, Ta, Re, Be, Hf, Os, Bi and I, W is tungsten, O is oxygen, satisfying 15 $0.001 \leq x/y \leq 1$; and $2.2 \leq z/y \leq 3.0$), reduced antimony tin oxide, or doped metal oxides such as aluminium-doped zinc oxide (AZO) and fluorine-doped tin oxide (FTO); conductive polymers such as poly polystyrene sulfonate (PEDOT); and combinations thereof. Preferably, the NIR absorber is selected from inorganic copper salts such as copper (II) hydroxide phosphate (CHP) and non-stoichiometric inorganic compounds such as reduced indium tin oxide, reduced zinc oxide, reduced tungsten oxide (tungsten bronze), reduced doped tungsten oxide including an inorganic compound of the following formula MxWyOz (where M is at least one element selected from the group consisting of H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, TI, Si, Ge, Sn, Pb, Sb, B, F, P, S, Se, Br, Te, Ti, Nb, V, Mo, Ta, Re, Be, Hf, Os, Bi and I, W is tungsten, O is oxygen, satisfying 15 $0.001 \leq x/y \leq 1$; and $2.2 \leq z/y \leq 3.0$). Preferably, when present, the laser-imageable composition comprises from 0.05 to 25 wt %, such as from 0.05 to 20 wt % of an NIR absorber. If near-infrared radiation is to be used as the radiation for forming the image, a near-infrared radiation absorber is preferably present in the laser-imageable composition.

The laser-imageable composition may further comprise an additive or combination of additives. Suitable additives will be well known to a person skilled in the art. Examples of suitable additives include, but are not limited to the following: polymers; light or energy absorbing agents; UV absorbers; surfactants; wetting agents; drying promoters; colourants such as pigments; tinting agents; fluorescent agents; plasticisers; optical brighteners; oxidising or reducing agents; stabilisers; light stabilising agents such as hindered amines; rheology modifiers such as thickening or thinning agents; amine synergists; matting agents; active clays; anti-settling agents; anti-sagging agents; dispersing agents; surface modification additives; slip additives; levelling agents; fillers; humectants; adhesion promoters; acid or base scavenging agents; retarders; defoamers; antifoaming agents; and combinations thereof. Preferably, when present, the laser-imageable composition comprises from 0.1 to 10 wt %, such as from 0.25 to 7.5 wt %, and more preferably, from 0.5 to 5 wt % of additives or combinations thereof.

Preferably, the laser-imageable composition does not comprise an additional binder component. By "additional binder component" is meant any component other than the oligomer and optional monomer that may act as a binder for the laser-imageable composition of the present invention. In particular, this includes pre-reacted components such as resins, for example acrylic resins, which if introduced into the composition during formulation, would be already reacted prior to formulation of the laser-imageable composition. The laser-imageable composition of the present invention does not include pre-reacted components. The laser-imageable composition of the present invention does not comprise a resin. The oligomer and optional monomer components of the laser-imageable composition of the present invention are reactive binders, i.e. react only upon formulation of the composition. They are not pre-reacted components, e.g. resins.

Preferably, the laser-imageable composition of the present invention does not comprise a pigment, for example, titanium dioxide.

The laser-imageable composition of the present invention is suitable for use in offset lithographic printing processes and techniques.

According to a second aspect of the present invention, there is provided a method of forming a laser-imageable composition according to the present invention, the method comprising combining an oxyanion of a multivalent metal and an oligomer.

The method of forming a laser-imageable composition according to the present invention may comprise:

(a) forming a composition comprising an oxyanion of a multivalent metal and an oligomer; and
(b) milling the composition to obtain a laser-imageable composition comprising an oxyanion of a multivalent metal and an oligomer, wherein the oxyanion of a multivalent metal comprises particles having a $D_{50}$ particle size distribution of 10 μm or less.

Alternatively, the method of forming a laser-imageable composition according to the present invention may comprise:

(a') milling an oxyanion of a multivalent metal to obtain particles having a $D_{50}$ particle size distribution of 10 μm or less; and
(b') combining the oxyanion of a multivalent metal comprising particles having a $D_{50}$ particle size distribution of 10 μm or less, with an oligomer.

When the laser-imageable composition further comprises a monomer, the monomer may be combined with the oxyanion of a multivalent metal comprising particles having a $D_{50}$ particle size distribution of 10 μm or less and the oligomer in step (b').

Preferably, the method of forming a laser-imageable composition according to the present invention comprises:

(a) forming a composition comprising an oxyanion of a multivalent metal and an oligomer; and
(b) milling the composition to obtain a laser-imageable composition comprising an oxyanion of a multivalent metal and an oligomer, wherein the oxyanion of a multivalent metal comprises particles having a $D_{50}$ particle size distribution of 10 μm or less.

When the laser-imageable composition further comprises a monomer, the monomer may be combined with the oxyanion of a multivalent metal and oligomer to form a composition in step (a) prior to milling. Alternatively, the monomer may be introduced into the composition after step (b). Preferably, when the laser-imageable composition further comprises a monomer, the monomer is combined with the oxyanion of a multivalent metal and the oligomer to form a composition in step (a) prior to milling.

Milling of the particles of the oxyanion of a multivalent metal, or the composition (and thus the particles of the oxyanion of a multivalent metal), may be carried out using any suitable process. Suitable milling processes will be well known to a person skilled in the art. Preferably, in the context of the present invention, the particles of the oxyanion of a multivalent metal, or the composition, is milled using triple roll milling on a triple roll mill and mechanical bead milling techniques. A single pass of the particles of the oxyanion of a multivalent metal, or the composition, through the machinery may be completed to achieve the desired particle size. However, preferably a minimum of 2 passes, more preferably 3 or more passes, of the particles of the oxyanion of a multivalent metal, or the composition, through the machinery are completed until the desired particle size distribution is obtained for the particles of the oxyanion of a multivalent metal.

For the method of forming a laser-imageable composition according to the present invention, the milling of the particles of the oxyanion of a multivalent metal, or the composition (and thus the particles of the oxyanion of a multivalent metal), may be carried out using an Exakt 50 (laboratory) or Buehler SDT-800 (commercial) unit.

It will be appreciated by a skilled person that in the method of forming a laser-imageable composition according to the present invention, when the particles of oxyanion of a multivalent metal and oligomer are combined, the particles of the oxyanion of a multivalent metal should be sufficiently wetted, dispersed and stabilised in the oligomer during the production of the laser-imageable composition.

For the method of forming a laser-imageable composition according to the present invention, the laser-imageable composition may have any of the features described above as preferred or optional with regard to the laser-imageable composition according to the present invention.

The laser-imageable composition according to the present invention may be applied to any suitable substrate. It will be appreciated that the components of the laser-imageable composition may vary depending upon the substrate to which the laser-imageable composition is to be applied.

Therefore, according to a third aspect of the present invention, there is provided a substrate comprising the laser-imageable composition according to the present invention applied thereto.

For the substrate comprising the laser-imageable composition of the present invention applied thereto, the laser-imageable composition may have any of the features described above as preferred or optional with regard to the laser-imageable composition according to the present invention.

It will be appreciated by a skilled person that, using an offset lithographic printing process, the laser-imageable composition according to the present invention can be applied to substrates at low coat weight. Accordingly, the substrate may be any substrate suitable for use in offset lithographic printing.

Examples of suitable substrates to which the laser-imageable composition of the present invention may be applied include, but are not limited to: polymers and recycled polymer materials such as polyethylene terephthalate (PET), polyethylene (PE), low density polyethylene (LDPE), high density polyethylene (HDPE), polystyrene (PS), polypropylene (PP), orientated polypropylene (OPP), biaxially orientated polypropylene (BOPP), cast polypropylene (CPP), polyamide (PA) such as nylon, polyvinyl chloride (PVC), or combinations thereof; cellulose; glass; plastic; metal and metal foils such as tinplate; textiles; paper, both glossy and matte; coated paper such as polymer-coated paper; corrugated paperboard, cartonboard, paperboard, cardboard, and equivalent recycled analogues, or combinations thereof; ceramics; foodstuffs and pharmaceutical preparations; or combinations thereof, e.g. polymer lined paper or polymer impregnated paper. Suitable substrates include multi-layered constructions formed from the materials and substrates listed above. The polymer and recycled polymer materials may be in the form of polymer foil or film substrates.

Preferably, the substrate to which the laser-imageable composition is applied is selected from plastic, polymer films and foils, folding cartons and cartonboard, metal and metal foils, paper, corrugated paperboard and cardboard and equivalent recycled analogues.

The laser-imageable composition of the present invention may be applied to non-metal substrates. In such instances, examples of suitable substrates to which the laser-imageable composition of the present invention may be applied include, but are not limited to: polymers and recycled polymer materials such as polyethylene terephthalate (PET), polyethylene (PE), low density polyethylene (LDPE), high density polyethylene (HDPE), polystyrene (PS), polypropylene (PP), orientated polypropylene (OPP), biaxially orientated polypropylene (BOPP), cast polypropylene (CPP), polyamide (PA) such as nylon, polyvinyl chloride (PVC), or combinations thereof; cellulose; glass; plastic; textiles; paper, both glossy and matte; coated paper such as polymer-coated paper; corrugated paperboard, cartonboard, paperboard, cardboard, and equivalent recycled analogues, or combinations thereof; ceramics; foodstuffs and pharmaceutical preparations; or combinations thereof, e.g. polymer lined paper or polymer impregnated paper. Suitable substrates include multi-layered constructions formed from the materials and substrates listed above. The polymer and recycled polymer materials may be in the form of polymer foil or film substrates.

When the substrate to which the laser-imageable composition is applied is a non-metal substrate, the substrate is preferably selected from plastic, polymer films and foils, folding cartons and carton board, paper, corrugated paper board and cardboard and equivalent recycled analogues.

The laser-imageable composition according to the present invention, or substrate comprising the laser-imageable composition of the present invention applied thereto, may be suitable for end use in labels (adhesive or wraparound), and/or in fast-moving consumer goods; packaging such as disposable packaging including food and hot or cold beverage containers and folding cartons; folding cartons; coated paper; can ends; decorative metal products; blister pack packaging; and medical and diagnostic devices and associated packaging; and outdoor products such as signage. The laser-imageable composition according to the present invention, or the substrate comprising the laser-imageable composition of the present invention applied thereto, may be used for coding and marking, tagging tracking and tracing and late-stage customisation or personalisation purposes.

In a fourth aspect of the invention, there is provided a method of forming a substrate comprising the laser-imageable composition of the present invention applied thereto, the method comprising applying to a substrate the laser-imageable composition according to the present invention.

For the method of forming a substrate comprising the laser-imageable composition of the present invention applied thereto, the laser-imageable composition may have any of the features described above as preferred or optional with regard to the present invention. In addition, the substrate comprising the laser-imageable composition of the present invention applied thereto may have any of the features described above as preferred or optional with regard to the present invention.

The laser-imageable composition according to the present invention is preferably applied to the substrate by an offset lithographic printing process.

The laser-imageable composition according to the present invention may be applied on the substrate to any suitable coat weight achievable using the offset lithographic printing process. It will be appreciated that the coat weight of the laser-imageable composition on the substrate will affect the optical density of the image formed, and thus the contrast of the formed image with the background of the laser-imageable composition.

The laser-imageable composition may be applied to the substrate to a thickness suitable for the offset lithographic printing process such as from 0.5 to 3 μm, or from 0.5 to 2.0 μm, such as from 0.5 to 1.1 μm, or from 0.5 to 1.0 μm. This thickness may be formed by application of one or more layers of the laser-imageable composition to the substrate. Preferably, this thickness is formed by the application of a single layer of the laser-imageable composition to the substrate.

The thickness may be measured by any suitable method. Suitable measuring methods will be well known to those skilled in the art. Typically, the thickness as defined herein may be measured using a micrometer or a coating thickness gauge. Such instruments will be well known to those skilled in the art.

The laser-imageable composition may be applied to the substrate to a coat weight of from 0.7 to 2 gsm (grams per square metre), such as from 0.7 to 1.8 gsm, or from 0.7 to 1.7 gsm. Preferably, the laser-imageable composition is applied to a coat weight of from 0.8 to 1.5 gsm, such as from 0.8 to 1.2 gsm. This coat weight may be brought about by application of one or more layers of the laser-imageable composition to the substrate. Preferably, this coat weight is brought about by the application of a single layer of the laser-imageable composition to the substrate.

The coat weight may be measured by any suitable method. Suitable measuring methods will be well known to those skilled in the art. Preferably, the coat weight is measured by weighing the same area of substrate with and without the laser-imageable composition applied thereto, and comparing the two weights. Typically, this is an average of several datasets.

It will be appreciated that even if only a single layer of the laser-imageable composition of the present invention is applied to the substrate by offset lithographic printing, a highly contrasting image can be formed, i.e. as discussed above, a ΔODB of 0.6 or greater is achieved.

The laser-imageable composition according to the present invention may be applied on the substrate as a single layer or in multiple layers, i.e. once or two or more times. Preferably, 1 to 3 layers of the laser-imageable composition are applied. More preferably, 1 to 2 layers of the laser-imageable composition are applied. Most preferably, the laser-imageable composition is applied as a single layer.

The laser-imageable composition may be applied directly to the substrate, i.e. with no layer positioned/applied between the laser-imageable composition and the substrate.

The laser-imageable composition may be applied on the substrate as an undercoat or an overcoat, on top of a primer or as a primer layer. The laser-imageable composition may also be applied on the substrate over a base colour coating layer and/or over or under a protective varnish layer. The laser-imageable composition may be applied to at least part or all of an exterior surface of the substrate.

Following application of the laser-imageable composition according to the present invention to the substrate, the laser-imageable composition may be cured using radiation. Preferably, the laser-imageable composition is cured using radiation following application of the laser-imageable composition to the substrate. More preferably, the laser-imageable composition is cured using UV-radiation (100 to 400 nm). The UV-radiation may be applied to the laser-imageable composition using any suitable source such as, for example, a UV laser source(s) or a UV lamp such as a mercury lamp providing UV radiation, or ionising radiation source(s) such as LED or electron beam source(s).

The laser-imageable composition according to the present invention may be utilised to form an image on a substrate.

Therefore, according to a fifth aspect of the invention, there is provided a method of forming an image on a substrate comprising the laser-imageable composition according to the present invention applied thereto, the method comprising exposing the laser-imageable composition to radiation to form an image on the substrate.

For the method of forming an image on a substrate comprising the laser-imageable composition according to the present invention applied thereto, the laser-imageable composition may have any of the features described above as preferred or optional with regard to the present invention. In addition, the substrate comprising the laser-imageable composition according to the present invention applied thereto may have any of the features described above as preferred or optional with regard to the present invention.

The term "image" incorporates, but is not limited to: logos, marks, graphics, figures, pictures, symbols, letters, numbers codes, such as linear barcodes, 2D Datamatrix, QR codes, Digimarc codes, and text, such as that based on alphanumerics and symbols. It will be appreciated that in the context of the present invention, it is the manipulation of the laser-imageable composition comprising the oxyanion of a multivalent metal as an image-forming compound that facilitates the formation of an image. The image formed will be human and/or machine readable, and can be used for coding and marking, tagging tracking and tracing and late-stage customisation or personalisation purposes. The density of the image is measured by ΔODB values as discussed above.

In the context of the present invention, the radiation is applied following application of the laser-imageable composition to the substrate and typically, after subsequent curing. Thus, the image will be formed following application of the laser-imageable composition to the substrate and typically, after subsequent curing.

It will be appreciated by a skilled person that the radiation selected will be that required to cause the 'image-forming compound' i.e. the oxyanion of a multivalent metal, to form a discernible black colour.

"Radiation" and like terms used herein refers to energy in the form of waves or particles, and in particular, refers to electromagnetic radiation such as ultraviolet (UV), visible, near-infrared (NIR) and infrared (IR) particle radiation, e.g. alpha (α) radiation, beta (β) radiation, neutron radiation and plasma. The wavelength ranges of the different regions of the electromagnetic spectrum are known to a skilled person.

The radiation may be selected from ultraviolet (UV) radiation with a wavelength of from 10 to 400 nm, visible radiation with a wavelength of from 400 to 700 nm, infrared (IR) radiation with a wavelength of from 700 nm to 1 mm, near-infrared (NIR) radiation with a wavelength of from 700 to 1600 nm. Preferably, the radiation is selected from visible radiation with a wavelength of from 400 to 700 nm, infrared (IR) radiation with a wavelength of 9000 to 12000 nm (applied using a $CO_2$ laser), infrared radiation with a wavelength of from 700 nm to 1 mm, and near-infrared (NIR) radiation with a wavelength of 700 to 1600 nm. More preferably, the radiation is selected from infrared (IR) radiation with a wavelength of 9000 to 12000 nm (applied using a $CO_2$ laser) such as 9300, 9600, 10200 or 10600 nm (applied using a $CO_2$ laser), infrared radiation with a wavelength of from 700 nm to 1 mm, and near-infrared (NIR) radiation with a wavelength of 700 to 1600 nm. Most preferably, the radiation is infrared (IR) radiation with a wavelength of 9000 to 12000 nm (applied using a $CO_2$ laser) such as 9300, 9600, 10200 or 10600 nm (applied using a $CO_2$ laser).

The radiation may be applied to the laser-imageable composition by any suitable means. Suitable means include laser excitation through application of radiation to the laser-imageable composition by a laser source(s). It will be understood by a skilled person that the radiation may be applied to the laser-imageable composition at localised positions to selectively facilitate the formation of the image at these localised positions in the laser-imageable composition. These localised positions may overlap with each other. It will also be understood by a skilled person that the radiation is applied to the laser-imageable composition for an appropriate amount of time required to facilitate the formation of image. Typically the time required to deliver sufficient radiation will depend upon the means used to apply radiation and the method of application. For example, in one embodiment, the radiation may be applied to the laser-imageable composition for less than 120 seconds (such as between 30 to 110 seconds, or even between 75 to 105 seconds), or for less than 60 seconds, such as for less than 20 seconds, or even less than 10 or 5 seconds.

It will be appreciated that when applied using a laser source(s), the radiation dosage applied can be controlled by alteration of the time for which the radiation is applied, the power of the means used to apply the radiation (wattage) and thus, the fluence (amount of energy delivered per unit area) delivered by a laser source(s), e.g. $J/cm^2$. It will be appreciated by a skilled person that this may affect the density of the image formed and degree of contrast of the image with the background. For example, where a laser source(s) is used to apply the radiation, the fluence (amount of energy delivered per unit area) may affect the density of the image formed. In the context of the present invention, the fluence is dependent upon the power of the means used to apply the radiation (wattage), and the time for which the radiation is applied to a particular localised position on the substrate, which may be controlled by the scanning speed of the laser or the speed of the moving stage. These two variables can be altered to change the fluence. Where the fluence is low (e.g. lower power and/or shorter irradiation times), the image formed will have lower optical density, and where the fluence is high (e.g. higher power and/or longer irradiation times), the image formed will have a higher density and be of higher contrast with the background of the laser-imageable composition. In the context of the present invention, fluence values may range from 0.01 to 20 J/cm$^2$, such as from 0.1 to 10 J/cm$^2$, and even from 0.5 to 5 J/cm$^2$.

Preferably, the radiation is applied to the laser-imageable composition at localised positions of the laser-imageable composition in order to form a desired image. Essentially, upon application of the radiation, a black colour is formed at the parts of the laser-imageable composition on the substrate to which the radiation is applied. A human and/or machine readable contrasting image is thus generated. It is the oxyanion of a multivalent metal functioning as the "image-forming compound" of the laser-imageable composition that enables an image to be formed.

In a sixth aspect of the invention, there is provided the use of a laser-imageable composition according to the present invention in offset lithographic printing.

For the use of the laser-imageable composition of the present invention in offset lithographic printing, the laser-imageable composition may have any of the features described above as preferred or optional with regard to the present invention.

In a seventh aspect of the present invention, there is provided the use of a laser-imageable composition according to the present invention in the formation of an image on a substrate.

For the use of the laser-imageable composition of the present invention in the formation of an image on a substrate, the laser-imageable composition may have any of the features described above as preferred or optional with regard to the present invention.

All of the features contained herein may be combined with any of the above aspects and in any combination.

Chemical Definitions

The term "alkyl" denotes a straight or branched saturated alkyl group, typically having from 1 to 20 carbon atoms; optionally alkyl groups can contain some degree of unsaturation (partial unsaturation) i.e. may contain one or more alkene/alkenyl moiety(s). An alkyl group may be optionally substituted with one or more functional groups.

All references to particular chemical compounds herein are to be interpreted as covering the compounds per se, and also, where appropriate, derivatives, hydrates, solvates, complexes, isomers and tautomers thereof.

For a better understanding of the present invention, and to show how embodiments of the same may be carried into effect, reference will now be made, by way of example, to the following experimental data.

EXAMPLES

For each of the examples, the colour of the laser-imageable composition is off-white or white upon formulation and application to the substrate, and prior to the application of any radiation thereto.

For each of the examples, print viscosity of the laser-imageable composition was measured at 22° C. using a Brookfield DV2T Viscometer with no. 7 spindle (RV spindle set), at an appropriate speed selected from 2, 10, 12, 20, 40, 60 and 100 rpm. Oligomer and monomer viscosities were measured at 25° C. As indicated in the examples, oligomer and monomer viscosities were either those provided for the commercially available products, or were measured using a Brookfield DV2T Viscometer with no. 7 spindle (RV spindle set), at an appropriate speed selected from 2, 10, 12, 20, 40, 60 and 100 rpm).

For each of the examples, following application to the substrate and prior to application of radiation, the laser-imageable composition was cured by UV radiation using a mercury lamp of power 160 W/cm.

For each of the examples, infrared radiation was applied using a $CO_2$ laser (Videojet VJ-3320 or SHC60) with a wavelength of 10.6 microns (10600 nm). The $CO_2$ laser had the following settings: 12.9 J/s (power); 176 ms (time); and 2.2704 J/cm$^2$ (fluence).

Example 1

A composition was prepared according to Table 1. All amounts are in weight percentage (wt %).

TABLE 1

| Components | Wt % |
|---|---|
| Genomer 4312 (polyester urethane acrylate oligomer) | 30 |
| Laromer TPGDA (tripropylene glycol diacrylate monomer) | 15 |
| AOM (oxyanion of a multivalent metal) | 50 |
| Genorad 20 (stabiliser) | 1 |
| TPO (photoinitiator) | 4 |

The viscosity of Genomer 4312 was 60 Pa-s (60,000 cP) and the viscosity of Laromer TPGDA was 0.018 Pa-s (18 cP).

The composition was milled by 5 passes through an Exakt 50 unit (triple roll mill) to produce a laser-imageable composition according to the present invention.

The print viscosity of the laser-imageable composition was measured as 103.6 Pa-s (103,600 cP).

A single layer of the laser-imageable composition was printed onto cartonboard by offset lithographic printing to a coat weight of 1.5 gsm.

Infrared radiation was then applied to the laser-imageable composition at localised positions such that a black colour was formed at the localised positions, facilitating the formation of an image.

Example 2

A composition was prepared according to Table 2. All amounts are in weight percentage (wt %).

TABLE 2

| Components | Wt % |
|---|---|
| Genomer 3414 (polyether acrylate oligomer) | 45 |
| Monomer | 0 |
| AOM (oxyanion of a multivalent metal) | 50 |
| Genorad 20 (stabiliser) | 1 |
| TPO (photoinititator) | 4 |

The viscosity of Genomer 3414 was 4.5 Pa-s (4,500 cP).

The composition was milled by 5 passes through an Exakt 50 unit (triple roll mill) to produce a laser-imageable composition according to the present invention.

The print viscosity of the laser-imageable composition was measured as 60 Pa-s (60,000 cP).

A single layer of the laser-imageable composition was printed onto cartonboard by offset lithographic printing to a coat weight of 1.5 gsm.

Infrared radiation was then applied to the laser-imageable composition at localised positions such that a black colour was formed at the localised positions, facilitating the formation of an image.

Example 3

A composition was prepared according to Table 3. All amounts are in weight percentage (wt %).

TABLE 3

| Components | Wt % |
|---|---|
| Genomer 3480 (polyether acrylate oligomer) | 45 |
| Monomer | 0 |
| AOM (oxyanion of a multivalent metal) | 50 |
| Genorad 20 (stabiliser) | 1 |
| TPO (photoinititator) | 4 |

The viscosity of Genomer 3480 was 3.2 Pa-s (3,200 cP).

The composition was milled by 5 passes through an Exakt 50 unit (triple roll mill) to produce a laser-imageable composition according to the present invention.

The print viscosity of the laser-imageable composition was measured as 152 Pa-s (152,000 cP).

A single layer of the laser-imageable composition was printed onto cartonboard by offset lithographic printing to a coat weight of 1.5 gsm.

Infrared radiation was then applied to the laser-imageable composition at localised positions such that a black colour was formed at the localised positions, facilitating the formation of an image.

Example 4

A composition was prepared according to Table 4. All amounts are in weight percentage (wt %).

TABLE 4

| Components | Wt % |
|---|---|
| Genomer 5271 (amine acrylate oligomer) | 45 |
| Monomer | 0 |
| AOM (oxyanion of a multivalent metal) | 50 |
| Genorad 20 (stabiliser) | 1 |
| TPO (photoinititator) | 4 |

The viscosity of Genomer 5271 was 1.2 Pa-s (1,200 cP).

The composition was milled by 5 passes through an Exakt 50 unit (triple roll mill) to produce a laser-imageable composition according to the present invention.

The print viscosity of the laser-imageable composition was measured as 155 Pa-s (155,000 cP).

A single layer of the laser-imageable composition was printed onto cartonboard by offset lithographic printing to a coat weight of 1.5 gsm.

Infrared radiation was then applied to the laser-imageable composition at localised positions such that a black colour was formed at the localised positions, facilitating the formation of an image.

Example 5

A composition was prepared according to Table 5. All amounts are in weight percentage (wt %).

TABLE 5

| Components | Wt % |
|---|---|
| Genomer 2263 (epoxy acrylate oligomer) | 30 |
| Miramer M320 (glycerylpropoxy triacrylate monomer- GPTA) | 15 |
| AOM (oxyanion of a multivalent metal) | 50 |
| Genorad 20 (stabiliser) | 1 |
| TPO (photoinititator) | 4 |

The viscosity of Genomer 2263 was measured as 500 Pa-s (500,000 cP) and the viscosity of Miramer M320 was 0.11 Pa-s (110 cP).

The composition was milled by 5 passes through an Exakt 50 unit (triple roll mill) to produce a laser-imageable composition according to the present invention.

The print viscosity of the laser-imageable composition was measured as 85.76 Pa-s (85,760 cP).

A single layer of the laser-imageable composition was printed onto cartonboard by offset lithographic printing to a coat weight of 1.5 gsm.

Infrared radiation was then applied to the laser-imageable composition at localised positions such that a black colour was formed at the localised positions, facilitating the formation of an image.

Example 6

A composition was prepared according to Table 6. All amounts are in weight percentage (wt %).

TABLE 6

| Components | Wt % |
|---|---|
| Genomer 2263 (epoxy acrylate oligomer) | 30 |
| Laromer TPGDA (tripropylene glycol diacrylate monomer) | 15 |
| AOM (oxyanion of a multivalent metal) | 50 |
| Genorad 20 (stabiliser) | 1 |
| TPO (photoinititator) | 4 |

The viscosity of Genomer 2263 was measured as 500 Pa-s (500,000 cP) and the viscosity of Laromer TPGDA was 0.018 Pa-s (18 cP).

The composition was milled by 2 passes through a Buehler SDT-800 (triple roll mill) to produce a laser-imageable composition according to the present invention.

The print viscosity of the laser-imageable composition was measured as 115 Pa-s (115,000 cP).

A single layer of the laser-imageable composition was printed onto cartonboard by offset lithographic printing to a coat weight of 1.5 gsm.

Infrared radiation was then applied to the laser-imageable composition at localised positions such that a black colour was formed at the localised positions, facilitating the formation of an image.

Example 7

A composition was prepared according to Table 7. All amounts are in weight percentage (wt %).

TABLE 7

| Components | Wt % |
|---|---|
| Genomer 2281 (modified bisphenol A epoxy acrylate oligomer) | 30 |
| Laromer TPGDA (tripropylene glycol diacrylate monomer) | 15 |
| AOM (oxyanion of a multivalent metal) | 50 |

TABLE 7-continued

| Components | Wt % |
|---|---|
| Genorad 20 (stabiliser) | 1 |
| TPO (photoinititator) | 4 |

The viscosity of Genomer 2281 was measured as 264 Pa-s (264,000 cP) and the viscosity of Laromer TPGDA was 0.018 Pa-s (18 cP).

The composition was milled by 5 passes through an Exakt 50 unit (triple roll mill) to produce a laser-imageable composition according to the present invention.

The print viscosity of the laser-imageable composition was measured as 59.2 Pa-s (59,200 cP).

A single layer of the laser-imageable composition was printed onto cartonboard by offset lithographic printing to a coat weight of 1.5 gsm.

Infrared radiation was then applied to the laser-imageable composition at localised positions such that a black colour was formed at the localised positions, facilitating the formation of an image.

Particle Size and Surface Area Analysis for Examples 1 to 7

$D_{50}$, $D_{10}$ and $D_{go}$ particle size distribution values and surface area were calculated for Examples 1 to 7 using a Malvern Mastersizer™ 3000 particle size analyzer from Malvern Instruments in accordance with ISO 13320:2009. The results are shown in Table 8.

TABLE 8

| Example | $D_{10}$ | $D_{50}$ | $D_{90}$ | Surface Area ($m^2$/kg) |
|---|---|---|---|---|
| 1 | 2.18 | 4.62 | 9.44 | 1449 |
| 2 | 2.33 | 5.07 | 20.2 | 1270 |
| 3 | 1.87 | 3.77 | 9.09 | 1710 |
| 4 | 3.56 | 6.56 | 12.1 | 968.1 |
| 5 | 2.21 | 7.84 | 14.6 | 1009 |
| 6 | 0.805 | 2.24 | 8.06 | 3758 |
| 7 | 1.59 | 5.16 | 16 | 1630 |

Optical density Black (ODB) Measurements for Examples 1 to 7 Absolute ODB and Background ODB were measured using an X-Rite SpectraEye spectrophotometer.

Absolute and Background ODB values for each of Examples 1 to 7 are shown in Table 9. ΔODB values (ODB value−Background ODB) for each of Examples 1 to 7 are also shown in Table 9.

TABLE 9

| Example | Absolute ODB | Background ODB | ΔODB |
|---|---|---|---|
| 1 | 0.8 | 0.07 | 0.73 |
| 2 | 0.91 | 0.07 | 0.84 |
| 3 | 0.89 | 0.06 | 0.83 |
| 4 | 0.9 | 0.07 | 0.83 |
| 5 | 0.7 | 0.07 | 0.63 |
| 6 | 1.12 | 0.07 | 1.05 |
| 7 | 0.8 | 0.07 | 0.73 |

For the laser-imageable composition of the present invention a ΔODB value of 0.6 or greater is desired. Such a ΔODB value demonstrates high optical density i.e. formation of a highly contrasting image. The image will be human and/or machine readable.

It can therefore be seen from the ΔODB values for Examples 1 to 7 that the laser-imageable compositions of the present invention facilitate high contrast image formation.

The invention claimed is:

1. A laser-imageable composition consisting of:

(a) an oxyanion of a multivalent metal;

(b) an oligomer;

(c) a monomer;

(d) a stabiliser; and (e) a photoinitiator, wherein the oxyanion of a multivalent metal comprises particles having a $D_{50}$ particle size distribution of 10 μm or less, wherein the particles of the oxyanion of a multivalent metal have a $D_{10}$ particle size distribution of 4 μm or less, and wherein the oligomer is selected from: an epoxy (meth) acrylate oligomer, a modified epoxy (meth)acrylate oligomer, an amine (meth)acrylate oligomer, and combinations thereof.

2. The laser-imageable composition according to claim 1, wherein the particles of the oxyanion of a multivalent metal have a $D_{50}$ particle size distribution of 7 μm or less.

3. The laser-imageable composition according to claim 1, wherein the particles of the oxyanion of a multivalent metal have a surface area of 950 $m^2$/kg or more.

4. The laser-imageable composition according to claim 1, wherein the oxyanion of a multivalent metal is an ammonium salt of an oxyanion of a multivalent metal.

5. The laser-imageable composition according to claim 1, wherein the oligomer is a radiation curable oligomer.

6. The laser-imageable composition according to claim 1, wherein the oligomer is selected from: an epoxy (meth) acrylate oligomer, modified epoxy (meth)acrylate oligomer, and combinations thereof.

7. The laser-imageable composition according to claim 1, wherein the monomer is selected from tripropylene glycol diacrylate (TPGDA), glycerylpropoxy triacrylate (GPTA), trimethylolpropane triacrylate (TMPTA), lauryl acrylate (LA), trimethylolpropane $(EO)_3$ triacrylate (TMP$(EO)_3$TA) and trimethylolpropane $(EO)_9$ triacrylate (TMP$(EO)_9$TA).

8. The laser-imageable composition according to claim 1, wherein the oligomer has a viscosity of 50 Pa-s or more.

9. The laser-imageable composition according to claim 1, wherein the monomer has a viscosity of 1.8 Pa-s or less.

10. The laser-imageable composition according to claim 1, wherein the monomer has a viscosity of from 0.01 to 1.8 Pa-s.

11. The laser-imageable composition according to claim 1, wherein the monomer has a viscosity of from 0.015 to 1.8 Pa-s.

12. The laser-imageable composition according to claim 1, wherein the oligomer is selected from a difunctional or trifunctional epoxy (meth)acrylate oligomer, modified epoxy (meth)acrylate oligomer, amine (meth)acrylate oligomer, and combinations thereof, and the monomer is selected from tripropylene glycol diacrylate (TPGDA), glycerylpropoxy triacrylate (GPTA), trimethylolpropane triacrylate (TMPTA), trimethylolpropane $(EO)_3$ triacrylate (TMP $(EO)_3$TA) and trimethylolpropane $(EO)_9$ triacrylate (TMP $(EO)_9$TA).

13. The laser-imageable composition according to claim 1, wherein the print viscosity of the laser-imageable composition is from 10 to 600 Pa-s.

14. The laser-imageable composition according to claim 1, wherein the laser-imageable composition is configured to be used in offset lithographic printing or the formation of an image on a substrate.

15. The laser-imageable composition according to claim 1, wherein the oligomer is difunctional, trifunctional or tetrafunctional, or an oligomer of higher functionality.

16. The laser-imageable composition according to claim 1, wherein the monomer is difunctional or trifunctional.

17. The laser-imageable composition according to claim 1, wherein the particles of the oxyanion of a multivalent metal have a $D_{90}$ particle size distribution of 25 μm or less.

18. A method of forming a substrate having a laser-imageable composition according to claim 1 applied thereto, the method comprising applying the laser-imageable composition to a substrate.

19. A method of forming an image on a substrate comprising a laser-imageable composition according to claim 1 applied thereto, the method comprises exposing the laser-imageable composition to radiation to form an image on the substrate.

20. A substrate comprising a laser-imageable composition according to claim 1, optionally wherein the substrate is a non-metal substrate.

21. The substrate according to claim 20, wherein the laser-imageable composition is applied to the substrate to a coat weight of from 0.7 to 2 gsm.

22. The substrate according to claim 20, wherein the substrate comprises a single layer of the laser-imageable composition applied thereto.

23. A laser-imageable composition comprising:

(a) an oxyanion of a multivalent metal; and (b) an oligomer;

wherein the oxyanion of a multivalent metal comprises particles having a $D_{50}$ particle size distribution of 10 μm or less, the particles of the oxyanion of a multivalent metal have a $D_{10}$ particle size distribution of 4 μm or less, wherein the oligomer is selected from: an epoxy (meth) acrylate oligomer, a modified epoxy (meth)acrylate oligomer, an amine (meth)acrylate oligomer, and combinations thereof, and wherein the laser-imageable composition does not comprise an additional component acting as a binder for the laser-imageable composition.

24. The laser-imageable composition according to claim 23, wherein the laser-imageable composition further comprises a monomer.

25. The laser-imageable composition according to claim 24, wherein the monomer is selected from tripropylene glycol diacrylate (TPGDA), glycerylpropoxy triacrylate (GPTA), trimethylolpropane triacrylate (TMPTA), lauryl acrylate (LA), trimethylolpropane $(EO)_3$ triacrylate (TMP $(EO)_3$TA) and trimethylolpropane $(EO)_9$ triacrylate (TMP $(EO)_9$TA).

26. A method of forming a laser-imageable composition according to claim 23, wherein the method comprises:

(a) forming a composition comprising an oxyanion of a multivalent metal and the oligomer; and (b) milling the composition to obtain the laser-imageable composition comprising the oxyanion of a multivalent metal and the oligomer, wherein the oxyanion of a multivalent metal comprises particles having a $D_{50}$ particle size distribution of 10 μm or less; and wherein the particles of the oxyanion of a multivalent metal have a $D_{10}$ particle size distribution of 4 μm or less.

* * * * *